Aug. 11, 1931.  J. F. STUMPF  1,818,966
SUBPLATE FOR DRILL JIGS
Filed Oct. 15, 1928  2 Sheets-Sheet 1
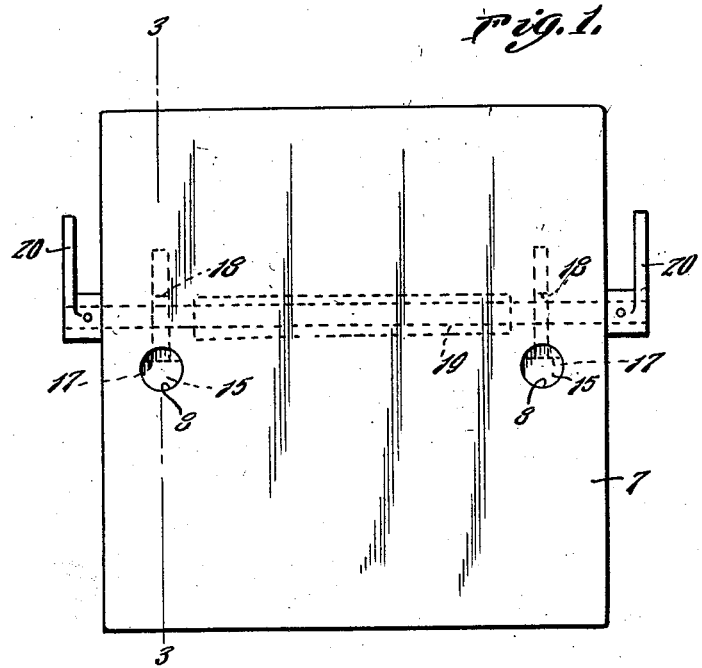
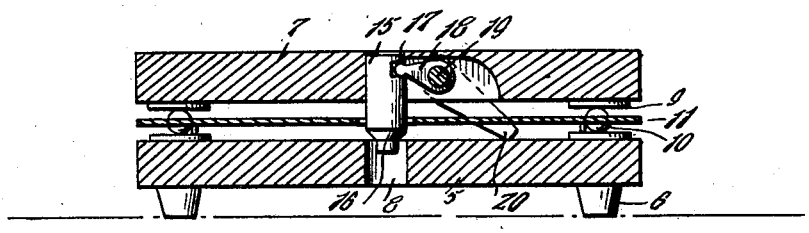
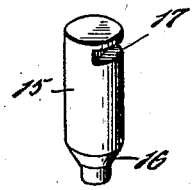
Inventor
J. F. Stumpf
By Clarence A. O'Brien
Attorney Aug. 11, 1931.  J. F. STUMPF  1,818,966
SUBPLATE FOR DRILL JIGS
Filed Oct. 15, 1928  2 Sheets-Sheet 2

Patented Aug. 11, 1931

1,818,966

UNITED STATES PATENT OFFICE

JOSEPH F. STUMPF, OF CHICAGO, ILLINOIS

SUBPLATE FOR DRILL JIGS

Application filed October 15, 1928. Serial No. 312,546.

The present invention relates to machine drills and more particularly to a drilling jig supporting plate adapted for automatically aligning of the center of the drill with the guide bushing of the jig and thus prevent uneven pressure upon the drill or the guide bushing.

A further object of the invention is to provide a sub-plate for drill jigs of this character which may be mounted in operative position upon the drill table without necessitating any changes or alterations in the construction thereof which assures accuracy in the drilling operation and which materially reduces the wear between the drill bit and the jig bushing due to the inaccurately alining of the same.

Figure 2:
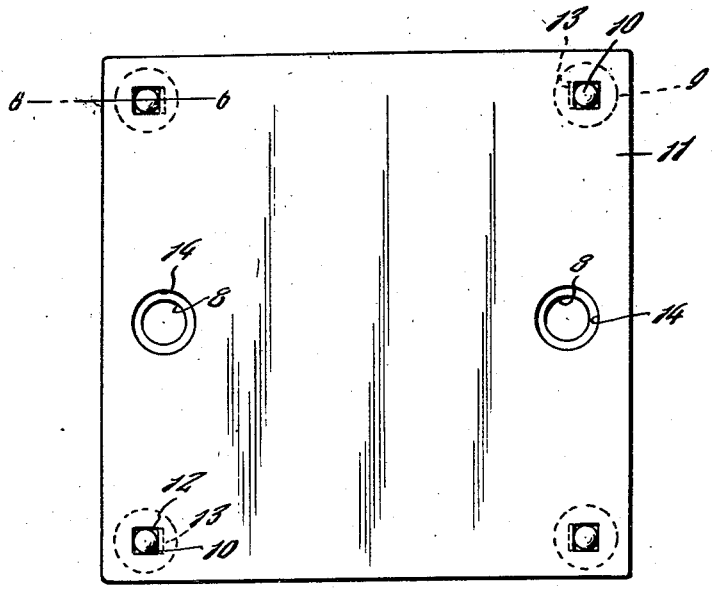
Figure 4:
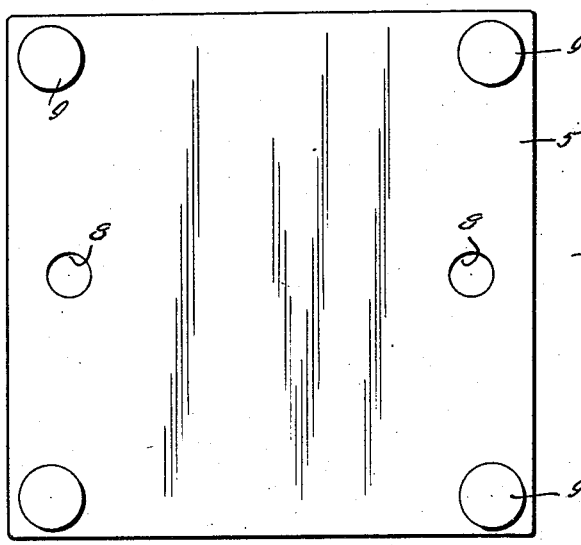
Figure 6:
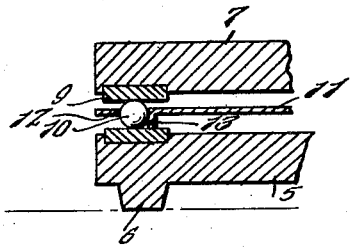

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a top plan view of the subplate forming the subject matter of the present invention, Figure 2 is a similar view with the upper plate removed, Figure 3 is a vertical sectional view through the device taken substantially along a line 3—3 of Figure 1, Figure 4 is a top plan view of the bottom plate member, Figure 5 is a perspective view of the plate locking pin, and Figure 6 is a fragmentary vertical sectional view through one corner of the device, taken substantially along a line 6—6 of Figure 2, and illustrating the ball bearing support for the upper plate member.

In the present use of machine drills it is impossible for the skilled mechanic to determine exactly when the center of the drill and the center of the drill bushing formed in the drill jig are accurately lined up and accordingly excessive wear occurs both in the drill and in the bushing of the jig, which not only produces inaccurately spaced holes in the work but also necessitates frequent replacement of the drill and the bushing of the jigs. It is accordingly the purpose of the present invention to provide means for automatically lining up the bushing of the drill jig with the drill bit so that the same will be accurately placed in position with each other at all times.

Referring now to the drawings in detail, the invention comprises a sub-base for drill jigs comprising an under plate member 5 supported on legs 6 and an upper plate member 7.

The plate members 5 and 7 are disposed in superimposed relation with respect to each other, each of said plate members being provided with vertically extending openings 8 adjacent the opposite side edges of each of the plates.

In the present embodiment of the invention, the plate members 5 and 7 are stated as being constructed square shaped with the opposed faces of each of the plate members, adjacent each corner thereof, provided with hardened and ground steel bearing plates 9, preferably in the form of disks recessed in the respective faces of the plates 5 and 7, as clearly illustrated in Figure 6 of the drawings and between which ball bearings 10 are interposed whereby to support the upper plate 7 for free sliding movement upon the lower plate member 5. A ball retaining plate 11 is interposed between the upper and lower plate members and provided adjacent each corner with openings 12 punched therefrom and with the punched material bent downwardly to form legs 13 for supporting the retaining plate in spaced relation upon the lower plate member 5.

The retaining plate 11 is also provided with a pair of openings 14 disposed in alinement with the opening 8 of the plate members 5 and 7 and of a diameter substantially larger therefrom.

A locking pin 15 is mounted for vertical sliding movement within each of the openings 8, the lower end of said pin being tapered as shown at 16 for guiding the pin into the opening of the lower plate and having a notch 17 formed in one side adjacent its upper end.

The notch 17 is adapted to receive the free end of a lever 18 carried on a rock shaft 19 journaled in the upper plate member 7 and with its ends protruding outwardly from the opposite side edges of the plate member and provided with operating handles 20.

In the operation of the device the sub-plate, composed of the superposed plate members 5 and 7, is placed upon the drilling table and the handles 20 operated for moving the locking pins 15 downwardly whereby to secure the plate members in fixed position with respect to each other.

The drill jig, carrying the work, is then placed upon the upper surface of the upper plate member 7 and the work is then roughly centered with respect to the drill bit. The handles 20 are then operated for moving the locking pin 15 upwardly whereby to release the plate members 5 and 7 and permit free sliding movement thereof along a horizontal plane.

Accordingly as the drill is fed through the guide bushing of the drill jig, the drill will be automatically centered with respect to said bushing by the freedom of movement permitted in the jig by reason of its support on top of the plate member 7 of the sub-plate.

Accordingly wear between the drill bit and the bushing of the jig is reduced to a minimum as the same will at all times be maintained in proper alinement during the drilling operation.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A sub-plate for drill jigs comprising an upper plate member and a lower plate member disposed in superposed relation, bearing plates fitted in the opposed faces of said plates, ball bearings mounted between said bearing plate, a ball bearing retaining plate interposed between said upper and lower plate members and engaging the balls whereby to secure the same in fixed relative position, each of said plates having a plurality of vertical openings formed therein adjacent opposite sides thereof, a clamping pin slidably mounted in each of said openings and adapted to extend within the openings of each of the plates whereby to secure the same in fixed position with respect to each other and means engageable with said pins and operable from opposite sides of the plate for simultaneously moving the same into or out of plate clamping-position, said means comprising a lever for each of the pins, a rock shaft journaled for rotation in the uppermost of said plate members with one end of each of the levers operatively connected thereto and with the other end of said levers operatively engageable with one of said pins, said shaft having its ends protruding from opposite sides of the plate and operating handles formed on each end thereof.

2. A sub-plate for drill jigs comprising a pair of relatively upper and lower plates, each of which is provided with vertically extending openings adjacent their respective opposite sides, a ball retaining plate between the said upper and lower plates and provided adjacent each corner with a bearing receiving opening, and a leg depending adjacent the opening for supporting the retaining plate in spaced relation to the said lower plate, and having ball receiving openings, said retaining plate being also provided with openings normally disposed in alignment with the vertically extending openings of the said upper and lower plates, ball bearings located within the bearing receiving openings of the retaining plate and supporting the upper plate for free sliding movement upon said lower plate, clamping pins for vertical sliding movement in each of the said vertically extending openings of the upper plate and retaining plate, and means for moving the said pins into and out of the aligned openings of the said lower plates the openings in the retaining plate being larger than the pins passing therethrough to permit free relative movement between the plates.

3. A support for a drill jig, comprising a bottom plate adapted to be held on a drill press table, an upper plate on which a drill jig is adapted to be placed, a plurality of spaced smooth hardened horizontal bearing surfaces on said plates facing each other, balls disposed between said plates and hardened bearing surfaces, and retaining means for maintaining said balls in contact with said hardened surfaces, whereby the upper plate and drill jig carried thereby may be moved by a relatively small drill striking the edge of a drill jig bushing, and whereby said drill jig is automatically perfectly aligned when it has initially been brought into approximate alignment.

In testimony whereof I affix my signature.

JOSEPH F. STUMPF.